March 16, 1965  E. D. S. RIGBY  3,173,516
VEHICLE BRAKES
Filed Sept. 4, 1962  5 Sheets-Sheet 1
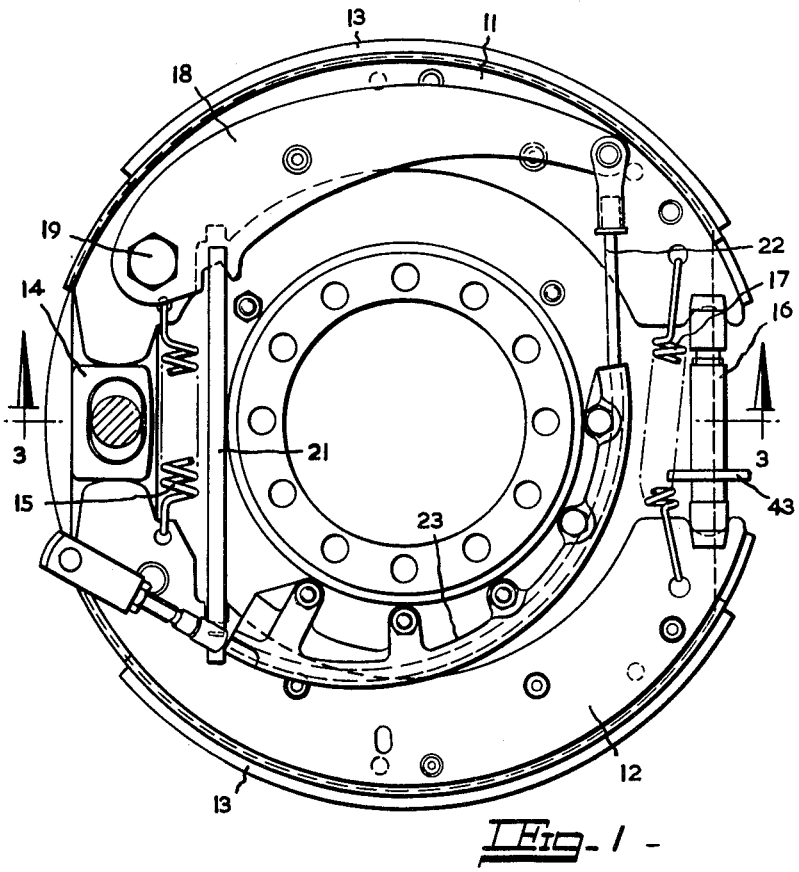
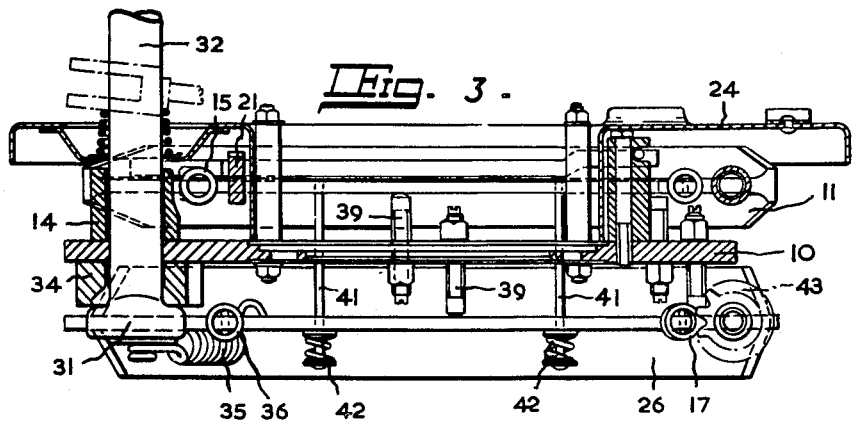
Edwin D. S. Rigby
By Scrivener & Parker

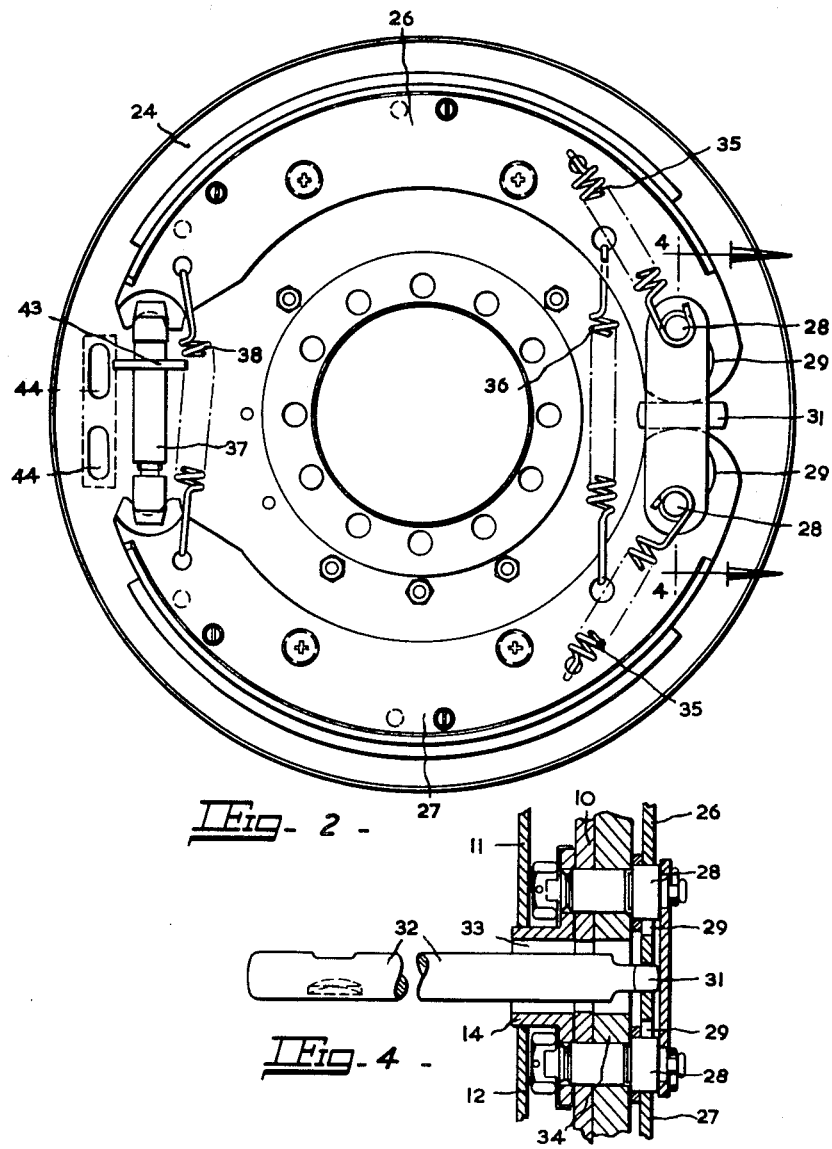

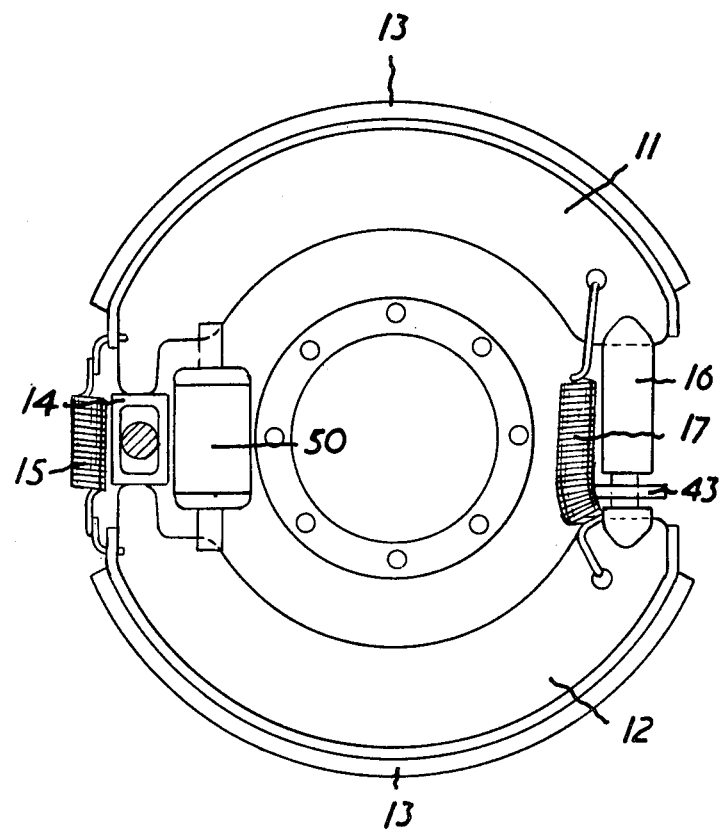

March 16, 1965  E. D. S. RIGBY  3,173,516
VEHICLE BRAKES
Filed Sept. 4, 1962  5 Sheets-Sheet 5

United States Patent Office 3,173,516
Patented Mar. 16, 1965

3,173,516
VEHICLE BRAKES
Edwin Dennis Smith Rigby, Birmingham, England, assignor to Girling Limited, Birmingham, England, a British company
Filed Sept. 4, 1962, Ser. No. 221,026
Claims priority, application Great Britain, Sept. 6, 1961, 31,958/61
7 Claims. (Cl. 188—79)

This invention relates to improvements in brakes for vehicles, and more particularly to brakes of the kind known as dual brakes in which two sets of braking elements are located side by side within a common drum or housing and are operable independently by separate actuating means.

A stationary torque plate is normally located between the two pairs of shoes, and hitherto the outboard brake has been actuated hydraulically with the hydraulic connections passing through the torque plate, while the inboard brake has been actuated mechanically by a cam on a shaft which is permitted a limited movement to compensate for unequal wear of the friction members.

According to our invention, the movable members of the outboard brake in a dual brake are actuated mechanically by means passing through the inboard brake.

The movable members of the inboard brake may also be actuated mechanically, or they may be actuated hydraulically.

Several forms of dual brake embodying my invention are illustrated by way of example in the accompanying drawings in which:

FIGURE 1 is an end elevation of the inboard brake of a dual brake of the shoe drum type with the dust cover removed;

FIGURE 2 is an end elevation of the outboard brake of the brake shown in FIGURE 1 viewed in the opposite direction;

FIGURE 3 is a section of the brake on the line 3—3 of FIGURE 1;

FIGURE 4 is a fragmentary section on the line 4—4 of FIGURE 2;

FIGURE 5 is an end elevation similar to the arrangement illustrated in FIG. 1 but showing a modification;

Figure 6:
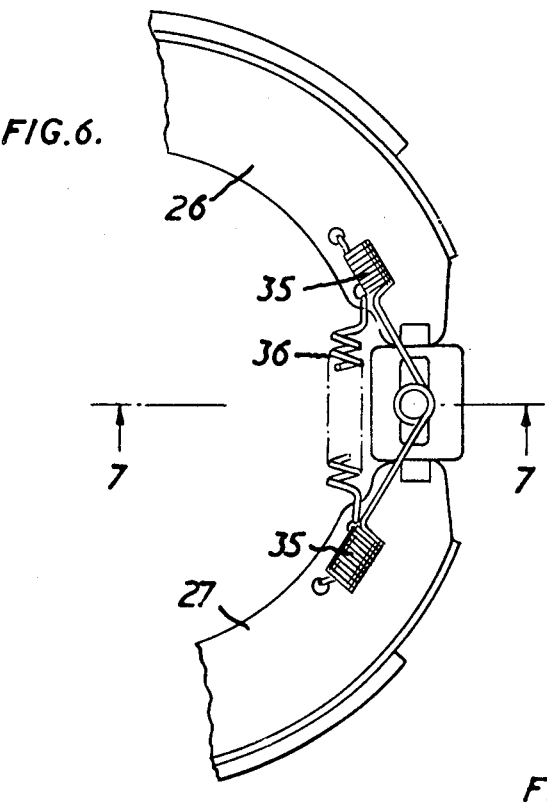
FIGURE 6 is an end elevation similar to FIGURE 2 but showing a modification.

Both the inboard and outboard brakes in the construction illustrated are of the self-energising or duo-servo type and incorporate opposed arcuate shoes co-operating with a common rotatable drum (not shown).

Also, in both brakes the shoes are mounted on a common stationary torque-taking plate 10 located between the two brakes.

In the inboard brake, the shoes 11, 12 which carry the usual friction linings 13 abut at one end on a block 14 rigidly fixed to the plate 10 and are normally held in engagement with the block 14 by a tension spring 15 connected between the shoe webs. A floating strut 16 of adjustable length is interposed between the other ends of the shoes which are held in engagement with the strut by a tension spring 17 connected between the shoe webs at this end.

The shoes are separated at their anchored ends to apply the brake by a curved lever 18 pivoted at 19 on the shoe 11 and a rigid strut or thrust member 21 interposes between the shoe webs.

The lever 18 is actuated by a cable 22 which is connected to the free end of the lever and is carried through an arcuate guide 23. The cable will normally be coupled to a hand-lever for applying the brake.

The inboard brake is enclosed by a sheet metal dust cover 24 carried from the torque plate 10.

In the outboard brake the shoes 26, 27 are adapted to anchor on pins 28 fixed in the torque plate and passing through elongated slots 29 in the shoe webs. These pins also serve for securing the block 14 to the torque plate as shown more particularly in FIGURE 4. To apply the brake the shoes are separated at this end by a cam 31 on a cam shaft 32 of which the axis is parallel to that of the brake, and which passes through the inboard brake and through an elongated part-circumferential slot 33 in the block 14 so that the cam can move circumferentially with the shoe ends. A spacing collar 34 is mounted on the cam shaft between the cam and the torque plate to locate the cam in the plane of the shoe webs. Springs 35 are connected between the shoe webs and the anchor pins 28 to hold the outer ends of the slots 29 normally in engagement with the pins for centering the shoes, and another spring 36 is connected across between the shoes.

A floating strut 37 of adjustable length is interposed between the other ends of the shoes which are held in engagement with the strut by a spring 38 connecting the shoe ends.

The shoes of both brakes are located in an axial direction by adjustable stops 39 (FIGURE 3) which are mounted in the torque plate and against which the shoe webs are urged by pins 41 which connect the webs of the corresponding shoes in the two brakes and are loaded by springs 42.

Both brakes are adjusted to compensate for wear of the shoe linings by rotation of one part of the floating strut between the shoes relative to the other. For this purpose, the rotatable parts of the struts carry toothed wheels 43 which can be engaged by a screw-driver or like tool inserted through slots 44 in the dust cover which are shown in FIGURE 2.

The arrangement shown in FIGURE 5 is similar to the arrangement shown in FIGURE 1 and corresponding reference numerals have been used to indicate corresponding parts. However, in this arrangement the shoes 11 and 12 of the inboard brake are separated at their anchored ends to apply the brake by a hydraulic actuator 50.

Figure 7:
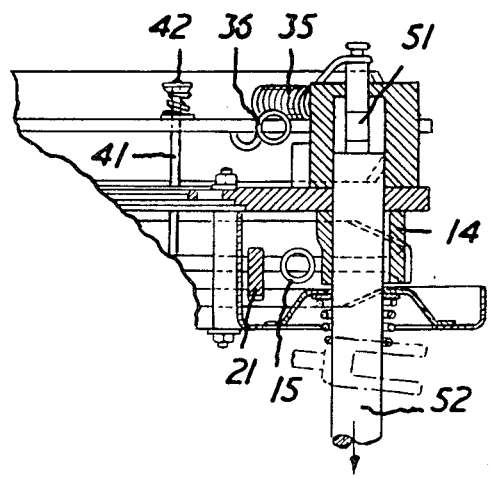
FIGURE 7 is a section of the brake on the line 7—7 of FIGURE 6.

In an alternative arrangement illustrated in FIGURES 6 and 7, the shoes 26 and 27 of the outboard brake may be separated by a wedge 51 or the like actuated by a member 52 movable in a direction parallel to the axis of the brake.

Figure 8:
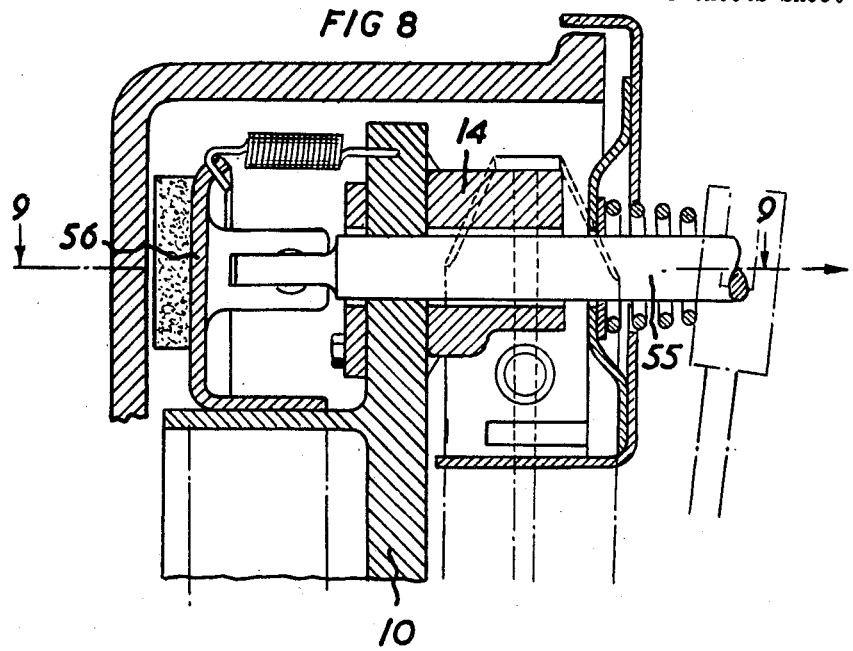
FIGURE 8 is a section through a dual brake and substantially on the line 8—8 of FIGURE 9 in which the inboard brake is a brake of the shoe drum type and the outboard brake is a brake of the plate type.
Figure 9:
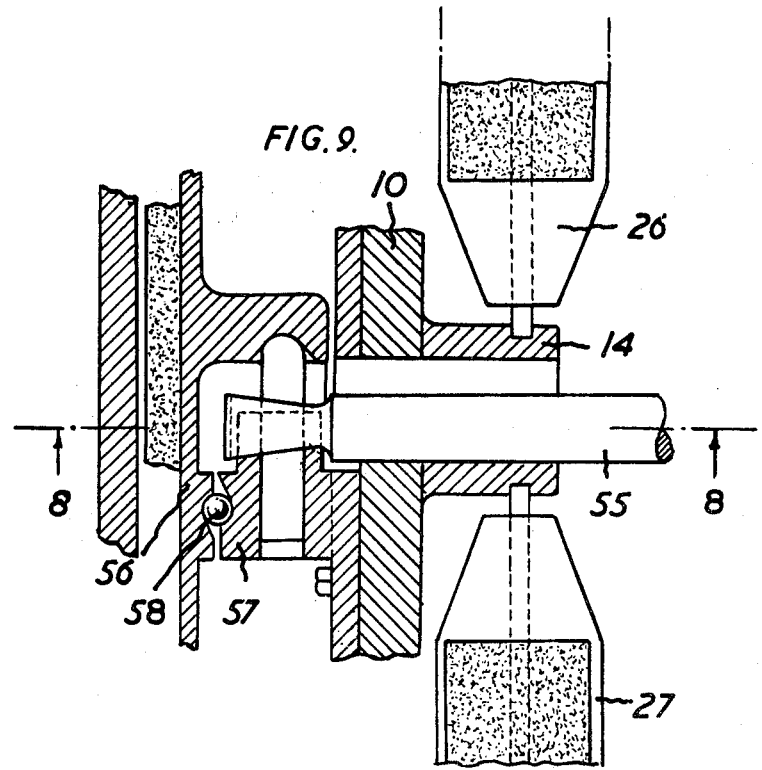
FIGURE 9 is a section on the line 9—9 of FIGURE 8.

In another form as illustrated in FIGURES 8 and 9, the outboard brake may be a disc brake of the plate type in which movement of an actuating member 55 in a direction parallel to the axis of the brake initiates relative angular movement between two discs or plates 56, 57 which are urged apart by servo means 58 arranged between them to bring one of the discs or plates 56 into engagement with a co-operating surface on the drum. The construction of the inboard brake is similar to the constructions described above and corresponding reference numerals have been used to indicate corresponding parts.

I claim:

1. A dual brake comprising a rotatable drum, a stationary torque plate having inboard and outboard sides, inboard brake elements for cooperation with said rotatable drum and located within said drum on said inboard side of said torque plate, outboard brake elements for cooperation with said rotatable drum independently of said inboard brake elements and located within said drum on said outboard side of said torque plate, means for applying said inboard brake elements to said drum, a block rigidly secured to said torque plate on its inboard side and providing an abutment for at least one of said inboard brake elements when said inboard brake elements are applied to said drum by said applying means, and mechanical means for applying said outboard brake elements to said drum operable independently of said applying means for said inboard brake elements and passing through said inboard brake and through an opening in said block.

2. A dual brake comprising a rotatable drum, a stationary torque plate having inboard and outboard sides, opposed arcuate brake shoes for cooperation with said rotatable drum mounted on said inboard side of said torque plate and having actuated ends and non-actuated ends, a floating strut connecting the non-actuated ends of said shoes, opposed arcuate brake shoes for cooperation with said rotatable drum independently of said inboard brake shoes and mounted on said outboard side of said torque plate, said outboard brake shoes having actuated and non-actuated ends, means for applying said inboard brake shoes to said drum, a block rigidly secured to said torque plate on its inboard side and providing an abutment for the actuated end of one of said inboard brake shoes according to the direction of rotation of said drum when said inboard brake shoes are applied to said drum, a shaft passing through said inboard brake and through an elongated slot in said block, and a cam on said shaft for separating said outboard shoes at their actuated ends.

3. A dual brake as claimed in claim 2, and further including a floating strut connecting the non-actuated ends of said outboard brake shoes.

4. A dual brake as claimed in claim 2, wherein the inboard brake shoes are applied hydraulically to said drum.

5. A dual brake comprising a rotatable drum, a stationary torque plate having inboard and outboard sides, opposed arcuate brake shoes for cooperation with said rotatable drum mounted on said inboard side of said torque plate and having actuated ends and non-actuated ends, a floating strut connecting the non-actuated ends of said shoes, opposed arcuate brake shoes for cooperation with said rotatable drum independently of said inboard brake shoes and mounted on said outboard side of said torque plate, said outboard brake shoes having actuated and non-actuated ends, a floating strut connecting the non-actuated ends of said outboard brake shoes, means for applying said inboard brake shoes to said drum, a block rigidly secured to said torque plate on its inboard side by pins fixed in said torque plate and passing through elongated slots in webs of said outboard brake shoes adjacent to their non-actuated ends, said block providing an abutment for the actuated end of one of said inboard brake shoes according to the direction of rotation of the said drum when said inboard brake shoes are applied to said drum, a shaft passing through said inboard brake and through an elongated slot in said block, and a cam on said shaft for separating said outboard shoes at their actuated ends whereby said outboard brake shoes anchor on said pins securing said block to said torque plate.

6. A dual brake comprising a rotatable drum, a stationary torque plate having inboard and outboard sides, opposed arcuate brake shoes for cooperation with said rotatable drum mounted on said inboard side of said torque plate and having actuated ends and non-actuated ends, a floating strut connecting the non-actuated ends of said shoes, opposed arcuate brake shoes for cooperation with said rotatable drum independently of said inboard brake shoes and mounted on said outboard side of said torque plate, said outboard brake shoes having actuated and non-actuated ends of said outboard brake shoes, a floating strut connecting the non-actuated ends of said shoes, means for applying said inboard brake shoes to said drum, a block rigidly secured to said torque plate on its inboard side by first and second pins fixed in said torque plate and passing through elongated slots in webs of said outboard brake shoes adjacent to their non-actuated ends, said block providing an abutment for the actuated end of one of said inboard brake shoes according to the direction of rotation of the said drum when said inboard brake shoes are applied to said drum, a floating shaft passing through said inboard brake and through an elongated slot in said block, and a cam on said shaft for separating said outboard shoes at their actuated ends whereby said first pin forms a torque taking abutment for said outboard brake shoes when said outboard shoes are applied with said drum rotating in one direction, and said second pin forms a torque taking abutment for said outboard shoes in the opposite direction of drum rotation.

7. A dual brake comprising a rotatable drum, a stationary torque plate having inboard and outboard sides, inboard and outboard braking surfaces on said drum on opposite sides of said torque plate, inboard brake elements for cooperation with said inboard braking surface on said rotatable drum and located within said drum on said inboard side of said torque plate, outboard brake elements for cooperation with said outboard braking surfaces on said rotatable drum independently of said inboard brake elements and located within said drum on said outboard side of said torque plate, means for applying said inboard brake elements to said drum, a block rigidly secured to said torque plate on its inboard side and providing an abutment for at least one of said inboard brake elements when said inboard brake elements are applied to said drum by said applying means, and mechanical means for applying said outboard brake elements to said drum operable independently of said applying means for said inboard brake elements and passing through said inboard brake and through an opening in said block.

References Cited by the Examiner
UNITED STATES PATENTS

| | | | |
|---|---|---|---|
| 1,320,669 | 11/19 | Auger | 188—79 |
| 2,202,454 | 5/40 | Kaufmann | 188—79 |
| 2,639,787 | 5/53 | Helvern | 188—79 |
| 2,985,260 | 5/61 | White | 188—79 |

ARTHUR L. LA POINT, *Primary Examiner.*

ABRAHAM G. STONE, *Examiner.*